July 5, 1966 A. H. BOTT 3,259,856

PHASE INVERTER AND AUTOMATIC FREQUENCY CONTROL STABILIZER FOR A FREQUENCY MODULATOR SYSTEM

Filed May 21, 1962

INVENTOR.
ADOLF HANS BOTT
BY
George J. Craig
ATTORNEY 3,259,856
Patented July 5, 1966

3,259,856

PHASE INVERTER AND AUTOMATIC FREQUENCY CONTROL STABILIZER FOR A FREQUENCY MODULATOR SYSTEM

Adolf Hans Bott, Cherry Hill Township, Camden County, N.J., assignor to Radio Corporation of America, a corporation of Delaware Filed May 21, 1962, Ser. No. 196,392
13 Claims. (Cl. 332—19)

Figure 1:
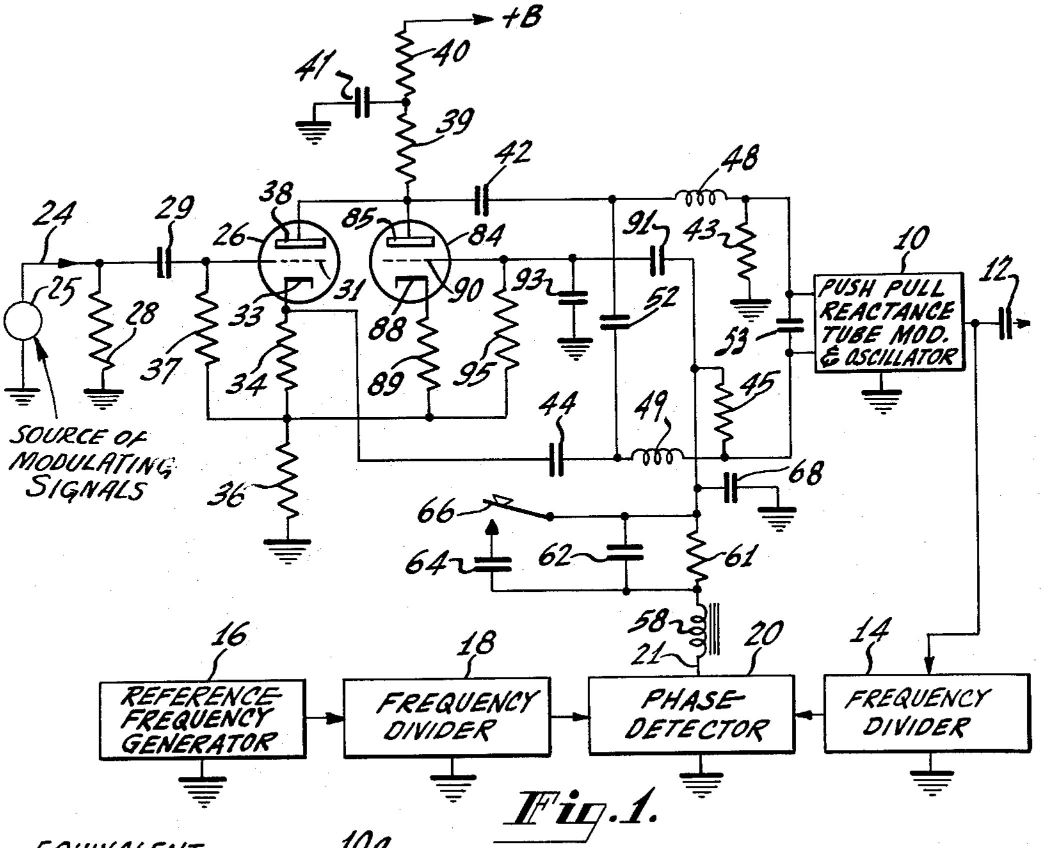

The present invention relates to improved phase inverters, and more particularly to an improved phase splitter or phase inverter for coupling a modulating signal source and a system for generating an AFC (automatic frequency control) signal to a reactance tube FM (frequency modulation) modulator while maintaining loop stability of the AFC signal system.

An object of the present invention is to provide a novel electronic phase inverter having a wide frequency response range.

Another object of the present invention is to provide a novel phase inverter for feeding a modulating signal voltage to a push-pull reactance tube modulator.

A further object of the present invention is to provide novel feedback loop means for applying a slowly varying D.C. (direct current) voltage to a reactance-tube-controlled oscillator without causing instability due to undesired phase shift of the slowly varying component of the D.C. AFC voltage.

A still further object of the present invention is to provide a novel electronic phase inverter having means to offset the effect of the presence of an additional filter capacitor and resistor on a D.C. control voltage which is added to one side of the output of the phase inverter.

When a phase inverter is employed to supply a signal to a pair of following push-pull amplifiers or other electronic devices, such for example as reactance tubes, at least one coupling capacitor is required. Where the reactance tubes are associated with an oscillator controlled by an AFC system, the AFC voltage appears across the undesired impedance represented by the coupling capacitor. In accordance with the present invention, a variable resistance device responsive to the AFC output is employed for effectively canceling the AFC voltage across the undesired impedance of the coupling capacitor.

In the illustrative example, a coupling capacitor is included in the phase inverter circuit which would produce a phase shift in the AFC loop. The high impedance input of a unity gain amplifier is responsive to the output voltage from the AFC loop, which voltage also appears on one terminal of said capacitor. The low impedance output of this amplifier applies substantially the voltage to the other terminal of said coupling capacitor. Thus, the phase shifting effect of the coupling capacitor on the AFC voltage is eliminated. The embodiment of the invention described herein provides a novel phase inverter system with a bandwidth extending from 5 c.p.s. (cycles per second) to 100,000 c.p.s.

The phase inverter system of this invention is especially useful for coupling a modulating signal derived from a stereo multiplex signal source to a push-pull FM modulator together with an AFC signal. The derived signal requires a bandwidth of from 5 c.p.s. to 100,000 c.p.s and is composed of an $L+R$ signal, a double side band suppressed carrier signal and a 19 kc. (kilocycle) pilot tone. This composite stereo multiplex signal, which is employed to frequency modulate a station carrier is set forth in sec. 3.322 of the Rules and Regulations of the Federal Communications Commission and need not be discussed further. The AFC signal is derived by comparing the output of the modulator with a fixed reference frequency.

Other objects and advantages of the present invention will, of course, become apparent and immediately suggest themselves to those skilled in the art to which the invention is directed from a reading of the following specification in connection with the accompanying drawing in which:

FIGURE 1 is a schematic diagram of an AFC controlled FM reactance tube modulator embodying the present invention; and FIGURES 2 to 5 are simplified schematic diagrams used in explaining features of the invention.

Referring to FIGURE 1 of the drawing, a push-pull reactance tube modulator 10 is connected through a coupling capacitor 12 to frequency multipliers (not shown) which produce a signal of proper frequency for amplification and radiation from a station antenna. The modulator 10 includes reactance tubes in push-pull relationship associated with an oscillator. An AFC system comprising a frequency divider 14, a reference frequency generator 16, a second frequency divider 18 and a phase detector 20 derives a D.C. control signal which appears in the conductor 21. Any deviations in the center or average frequency of the modulator oscillator from a predetermined value appear as a corresponding change in the control voltage on the conductor 21 and these voltage changes are applied to the control electrode of one of the reactance tubes in the modulator 10 in a manner to be described. The arrangement thus far described is similar to that shown in Bott et al. United States Patent No. 3,005,167.

The modulating signal to be supplied to the reactance tube modulator in push-pull is transmitted through a preemphasis network (not shown) to the input terminal 24 of the phase inverter 26, across a resistor 28. A source of modulating signals is indicated generally at 25. The phase inverter 26 is shown by way of example as a vacuum tube amplifier connected to have a gain of unity or slightly greater than unity. However, it will be understood that other amplifying devices may be used. The term "amplifier" is used herein for convenience irrespective of whether the gain is greater or less than unity. The modulating signal, as stated above, requires a channel having a bandwidth extending from near or below 5 c.p.s. to 100,000 c.p.s. A coupling capacitor 29 is connected between the terminal 24 and the control electrode or grid 31 of the tube 26. The cathode 33 is connected to a point of circuit reference potential, ground for example, by way of a cathode resistor 34 and an additional resistor 36. An input or grid return resistor 37 is connected from the grid 31 to the junction of the resistors 34 and 36. The anode 38 is connected to a source of positive potential (not shown) by way of a load resistor 39 and dropping resistor 40. A decoupling capacitor 41 is connected between the junction of these resistors and circuit ground. The positive potential source may be any known power supply with its negative terminal connected to circuit ground. The anode 38 is connected to the grid of one push-pull reactance modulator tube by way of a coupling capacitor 42 and an input or grid return resistor 43. The cathode 33 is connected to the grid of the other reactance modulator tube by way of a coupling capacitor 44 and an input resistor 45. The latter is connected to circuit ground by way of the output conductor 21 of the phase detector and the usual phase detector diode resistors (not shown separately). Inductors 48 and 49 are in series, respectively, in each modulator grid input lead and are located between the capacitors 52 and 53 of small value which are bridged across these leads. The capacitor 53 is connected directly across the grids of the reactance tubes.

The phase inverter tube 26 and its associated circuitry described above for coupling the single ended input, represented by the input terminal 24, to the push-pull reactance tube modulator 10 provides in the manner shown in United States Patent No. 3,005,167 above referred to a greater bandwidth than readily obtainable with a transformer. Resistors 43 and 45 are necessary to provide a grid return for each reactance tube. Therefore, an extremely low frequency or D.C. path through a transformer secondary is not available for conveying the AFC signal appearing at the output conductor 21 of the phase detector 20. This AFC signal is applied to the grid of one reactance tube by way of the resistor 45 which is associated with the coupling capacitor 44. The uncompensated effect of the resistor 45 and the coupling capacitor 44 on AFC system stability which is overcome by the present arrangement will be discussed later in connection with FIGURE 4 of the drawing. The AFC signal connection to the resistor 45 includes an inductor 58 and a resistor 61 bridged by a capacitor 62. A second capacitor 64 may also be connected to bridge the resistor 61 by a normally-open switch 66. A filter capacitor 68 is connected from the junction of the resistors 45 and 61 to circuit ground. High frequency components of the output signal from the phase detector 20 are filtered out by the inductance 58 in conjunction with internal capacitors (not shown) of the phase detector 20 which are bridged across the internal diode resistors (also not shown). The network comprising capacitors 68, 62 and 64 and the resistor 61 extends the control range of the phase detector when the switch 66 is closed. Closure of the switch 66 is provided for only when the frequency of the oscillator of the reactance tube modulator and the oscillator 10 departs from normal so that it is beyond the pull-in range of the AFC system.

Figure 2:
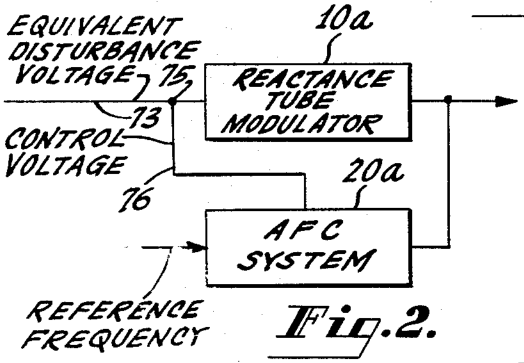
Figures 3, 5:
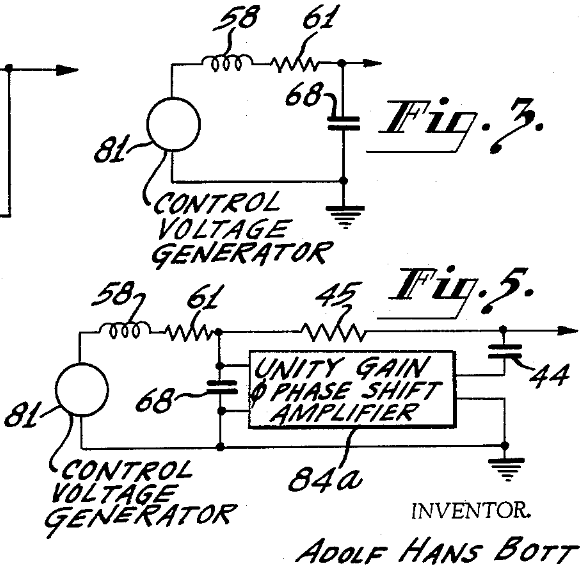
Figure 4:
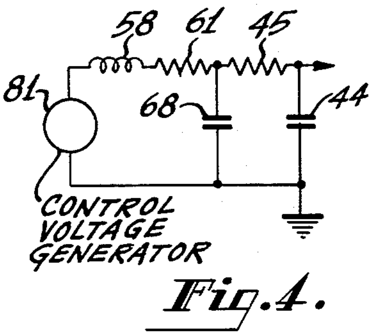

The uncompensated effect of the resistor 45 and the coupling capacitor 44 on AFC system stability will now be discussed. Referring to FIGURE 2 of the drawing, which shows the general case of a reactance tube modulator **10*a* operating under control of an AFC system 20*a*, an equivalent disturbance voltage is indicated as appearing on the conductor 73. FIGURE 2 is an equivalent circuit of the modulating system of FIGURE 1 as it would appear if modulating signals were fed to the reactance tube grids by a phase inverting transformer rather than by the phase inverter tube 26 with the coupling capacitor 44 and the grid return resistor 45. The disturbance voltage is generated within the modulator 10*a* and is to be eliminated by the AFC system 20*a*. The equivalent disturbance voltage has a D.C. component and this component is, in effect, combined at the point 75 with the D.C. control voltage appearing in the conductor 76 from the AFC system 20*a*. For the AFC signal to be stable, the equivalent disturbance voltage and the control voltages must be 180° out of phase. The equivalent disturbance voltage is assumed to modulate an ideal modulator with the same waveforms such as drift due to temperature variations, tube variations, etc. that are normally found to be inherent in a practical modulator. The frequency and phase response of the AFC loop including the modulator must be such that for a gain greater than one, the phase does not go to 0° or 360°. This condition is known as one form of the Nyquist stability criterion. FIGURE 3 shows a simplified equivalent circuit including components of FIGURE 1 with the D.C. control signal fed to the grid of one modulator tube through the secondary of a phase inverting transformer thereby not requiring the capacitor 44 and the resistor 45. The D.C. control voltage source of the AFC system is represented by the generator 81. The inductor 58 and capacitor 68 of FIGURE 1 are shown. Resistor 61 has a value which is very large relative to the reactance of inductor 58**. This configuration is stable as the phase shift cannot exceed 90°. FIGURE 4 represents the equivalent circuit of the phase inverter and AFC system of FIGURE 1 without benefit of the present invention which is unstable since the phase shift is now 180° and oscillations will be caused if the loop gain is greater than unity. In effect, the signal is applied to the grid of the reactance tube at 0° phase which is a condition for generating oscillations.

The instability just explained in connection with FIGURE 4 is overcome in accordance with the present invention by inclusion of an amplifier, shown by way of example as the tube 84 (FIGURE 1) having its anode 85 connected to the anode 38 of the phase inverter tube 26. The cathode 88 is connected through a cathode resistor 89 to the junction of the resistors 34 and 36 whereby the tube 84 acts as a cathode follower for the AFC voltage. The control electrode or grid 90 is connected to the junction of the resistor 45 and the capacitor 68 by way of a coupling capacitor 91. A capacitor 93 of relatively small value is connected from the grid 90 to ground. A grid return resistor 95 is connected from the grid 90 to the junction of the resistors 89 and 36.

Referring to FIGURE 5, illustrating the principle applied in overcoming the instability of FIGURE 4, an amplifier **84*a* having a gain of unity or nearly unity is connected with its high impedance input across the capacitor 68 FIGURES 1 and 5. Its low impedance output applies the voltage appearing across the capacitor 68 in series with the capacitor 44. The effect of the resistor 45 and capacitor 44** is eliminated and the stable configuration of FIGURE 3 is re-established. The phase shift at the output of FIGURE 5 is limited to approximately 90°.

The amplifier **84*a* of FIGURE 5 is represented by the components of FIGURE 1 as follows: the input to the grid 90 of the tube 84 is by way of the coupling capacitor 91. The output circuit of the amplifier 84*a* includes the cathode 88 of the tube 84 and the resistors 89 and 36. The output appears at the connection of the resistor 34 to the cathode 33 of the tube 26**.

In FIGURE 1 the amplifier tube 84 represents a variable D.C. load resistance to the phase inverter tube 26 and will thus affect the voltages appearing across resistor 34, resistor 36 and resistor 39. The output of the amplifier tube 84 is applied through the capacitor 44 to one end of the resistor 45. FIGURE 1 shows a desirable connection of the capacitor 44 to the cathode 33 of the tube 26. This connection could be made to the junction of resistors 34 and 36, or to the cathode of tube 84. The phase inverter of FIGURE 1 will have a gain slightly higher than unity because the control effective through the tube 84 will appear not only at the cathode 33 but also at the anode 38. This will overcome a certain loss in gain of the cathode follower tube 26, and bring the total gain to greater than unity. This gain will be added to the total loop gain. The system will be stable since the loop phase will stay well away from 0° or 360° at a frequency where the loop gain is unity. An additional benefit is present as the gain of the AFC loop is slightly higher at frequencies above about 0.1 c.p.s. relative to the D.C. gain and the circuit will more readily establish initial frequency control when operation is started. The gain of the amplifier tube 84 will roll off 6 db per octave below 0.1 c.p.s. This is of no consequence as the instability of the equivalent circuit of FIGURE 4 occurs only at frequencies above approximately 1 c.p.s.

In summary it can be said that the tubes 26 and 84 are two phase inverters or splitters connected in parallel. They can independently be controlled from the grid 31 as well as from the grid 90. The voltages appearing at the cathodes and plates are always the sums of the signals to the grids. Therefore, the control signal present across the capacitor 68 will appear at the cathode 88 and for all practical purposes unchanged at the cathode 33. This point represents one output terminal of the amplifier **84*a*** of FIGURE 5, as stated above.

The connection of the capacitor 44 to the cathode 33 is preferred and was chosen to preserve the fidelity of the composite stereo signal fed to the grid 31. The capacitor 44 could also have been connected to the cathode 88 or the junction of resistors 36, 34, and 89.

What is claimed is:

1. In combination,
a frequency modulator of the type having an oscillator, an automatic frequency control system having an input coupled to said oscillator and having means for providing a control signal for said oscillator, a phase inverter including coupling means for applying an input signal to said frequency modulator, said coupling means tending to introduce an undesired phase shift in said control signal, and means for substantially eliminating the phase shift effect of said coupling means on said control signal.

2. In combination,
a frequency modulator of the type having an oscillator, an automatic frequency control system having an input coupled to said oscillator and having means for providing a control signal for said oscillator, a phase inverter including coupling means for applying an input signal to said frequency modulator, said coupling means including a pair of input and a pair of output terminals, said coupling means tending to introduce an undesired phase shift in said control signal, and means for substantially eliminating the effect of said coupling means on said control signal, said last named means comprising means responsive to said control signal for effectively applying said control signal to said pair of input and to said pair of output terminals of said coupling means.

3. In combination,
a frequency modulator of the type having an oscillator, an automatic frequency control system having an input coupled to said oscillator and having means for providing a control signal for said oscillator, a phase inverter including coupling means for applying an input signal to said frequency modulator, said coupling means including a capacitor, said capacitor of said coupling means tending to introduce an undesired phase shift in said control signal, and means comprising a variable resistance device for substantially eliminating the effect of said coupling means on said control signal.

4. In combination,
a frequency modulator of the type having an oscillator, an automatic frequency control system having an input coupled to said oscillator and having means for providing a control signal for said oscillator, a phase inverter including coupling means for applying an input signal to said frequency modulator, said coupling means including a capacitor, said capacitor of said coupling means tending to introduce an undesired phase shift in said control signal, said means for providing a control signal causing control signal voltage to appear at one terminal of said coupling capacitor, an amplifying device having substantially unity gain, input and output means for said amplifying device, means for coupling said input means to said means for providing a control signal voltage, and means for coupling said output means effectively to said other terminal of said capacitor whereby substantially to eliminate the effect of said coupling means on said control signal.

5. In combination,
a frequency modulator of the type having an oscillator, an automatic frequency control system having an input coupled to said oscillator and having means for providing a control signal for said oscillator, a phase inverter including coupling means for applying an input signal to said frequency modulator, said coupling means including a capacitor, said capacitor of said coupling means tending to introduce an undesired phase shift in said control signal, said means for providing a control signal causing control signal voltage to appear at one terminal of said coupling capacitor, an amplifying device having a cathode, an anode and a control electrode, said device having substantially unity gain, means for coupling said control electrode to said means for providing a control signal voltage, means for coupling anode to said means coupling said phase inverter to said modulator and means for coupling said cathode effectively to said other terminal of said capacitor whereby substantially to eliminate the effect of said coupling means on said control signal.

6. A phase inverter and automatic frequency control system comprising a phase inverter amplifier and an oscillator, said automatic frequency control system having input means and output means, output means for said amplifier coupled to said oscillator, said output means comprising a series capacitor between said amplifier and said oscillator and a shunt resistor, a second amplifier having input means and output means, means for coupling said output means of said second amplifier to said output means of said first amplifier, means for providing an output signal from said oscillator to said input means of said automatic frequency control system, means for connecting the output means of said automatic frequency control system to said resistor and means for coupling the output means of said automatic frequency control system to said input circuit of said second amplifier whereby said second amplifier overcomes the frequency shift effect of said capacitor and resistor.

7. A phase inverter and automatic frequency control system comprising a phase inverter amplifier and an oscillator, said automatic frequency control system having input means and output means, output means for said amplifier coupled to said oscillator, said output means comprising a series capacitor between said amplifier and said oscillator and a shunt resistor, a second amplifier having input means and output means, means for coupling said output means of said second amplifier to said output means of said first amplifier, means for providing an output signal from said oscillator to said input means of said automatic frequency control system, means including a second capacitor for connecting the output means of said automatic frequency control system to said resistor, means for coupling said second capacitor to the input means of said second amplifier whereby said second amplifier overcomes the frequency shift effect of said first mentioned capacitor and said resistor.

8. A phase inverter and automatic frequency control system comprising a phase inverter amplifier and an oscillator, said automatic frequency control system having input means and output means, output means for said amplifier coupled to said oscillator, said output means comprising a series capacitor between said amplifier and said oscillator and a shunt resistor, a second amplifier having an input circuit and an output circuit, means for connecting said second amplifier to said output means of said first amplifier, means for providing an output signal from said oscillator to said input means of said automatic frequency control system, a second capacitor bridging said output means of said automatic frequency control system, means for connecting the output means of said automatic frequency control system to said resistor, means for coupling said second capacitor to the input means of said second amplifier whereby said second amplifier overcomes the phase shift effect of said first mentioned capacitor and said resistor.

9. A phase inverter and automatic frequency control system having means for developing a control signal comprising a phase inverter amplifier and an oscillator, said control signal developing means having input means and output means, output means for said amplifier coupled to said oscillator, said output means comprising a series capacitor between said amplifier and said oscillator and a shunt resistor, means for providing an output signal from said oscillator to said input means of said control signal developing means, a filter capacitor bridging said output means of said control signal developing means, means for connecting the output means of said control signal developing means to said resistor, a second amplifier having an input circuit and an output circuit, means for coupling said filter capacitor to the input circuit of said second amplifier and means including first named capacitor in series for coupling said output circuit of said second amplifier to said output means of said control signal developing means.

10. A frequency modulation system comprising a push-pull reactance tube modulator and a phase inverter, said phase inverter comprising an amplifier having an anode, a cathode and a control electrode, means to provide an input modulating signal to said control electrode, means to couple said anode to said modulator comprising a coupling capacitor and a resistor connected to a point of circuit reference potential in said system, means to couple said cathode to said modulator comprising a second coupling capacitor and a second resistor, a phase detector having an input circuit and an output circuit, means to couple said modulator to said input circuit of said phase detector, means to connect said output circuit of said phase detector to said second resistor, a filter capacitor connected between said phase detector output circuit and said point of reference potential, a second amplifier having an anode, a cathode and a control electrode, means connecting said anode of said second amplifier to said anode of said first amplifier, means connecting said cathode of said second amplifier to said cathode of said first amplifier, means connecting said control electrode of said second amplifier to said output circuit of said phase detector.

11. In combination with a frequency modulator of the type having variable reactances associated in push-pull relationship and having an automatic frequency oscillator, an electronic phase inverter device having a pair of output electrodes and a control electrode, a source of modulating signals, means coupling said source to said control electrode, means coupling one of said output electrodes to said frequency modulator, a second means coupling the other of said output electrodes to said frequency modulator, a phase detector for developing a control signal output, means coupling the output of said oscillator to said phase detector, means to supply a standard frequency from a standard frequency source to said phase detector, a second electronic phase inverter device having a pair of output electrodes and a control electrode, means coupling said control signal output to said control electrode of said second inverter device, means coupling one of said output electrodes of said second inverter device to said frequency modulator, a second means coupling the other of said output electrodes of said second inverter device to said frequency modulator whereby said inverter devices are connected in parallel.

12. In combination with a frequency modulator of the type having variable reactances associated in push-pull relationship and having an automatic frequency controlled oscillator, an electronic phase inverter device having a cathode, an anode and a control electrode, a source of modulating signals, means coupling said source to said control electrode, means coupling said anode to said frequency modulator, a second means coupling said cathode to said frequency modulator, a phase detector for developing a control signal output, means coupling the output of said oscillator to said phase detector, means to supply a standard frequency from a standard frequency source to said phase detector, a second electronic phase inverter device having a cathode, an anode and a control electrode, means coupling said control signal output to said control electrode of said second inverter device, means coupling said anode of said second inverter device to said frequency modulator, a second means coupling said cathode of said second inverter device to said frequency modulator whereby said inverter devices are connected in parallel.

13. In combination with a frequency modulator of the type having variable reactances associated in push-pull relationship and having an automatic frequency controlled oscillator, an electronic phase inverter device having a pair of output electrodes and a control electrode, a source of modulating signals, means coupling said source to said control electrode, means including a first coupling capacitor coupling one of said output electrodes to said frequency modulator, a second means including a second coupling capacitor coupling the other of said output electrodes to said frequency modulator, means coupling said other output electrode to a point of reference potential for said frequency modulator, a phase detector for developing a control signal output at a first output connection, a second output connection for said phase detector connected to said point of reference potential, means coupling the output of said oscillator to said phase detector, means to supply a standard frequency from a standard frequency source to said phase detector, a second electronic phase inverter device having a pair of output electrodes and a control electrode, means coupling said first output connection of said phase detector to said control electrode of said second inverter device, a connection from one of said output electrodes of said second inverter device to said one output electrode of said first phase inverter device, means including said second coupling capacitor coupling said other output electrode of said second phase inverter device to said frequency modulator, a connection including a resistor from said first output connection of said phase detector to said frequency modulator between said second coupling capacitor and said frequency modulator.

References Cited by the Examiner

UNITED STATES PATENTS

| | | | |
|---|---|---|---|
| 2,904,757 | 9/1959 | Wolcott | 332—28 X |
| 2,944,226 | 7/1960 | Rawlins | 332—19 |
| 3,005,167 | 10/1961 | Bott et al. | 332—21 |

ROY LAKE, *Primary Examiner.*

A. L. BRODY, *Assistant Examiner.*